United States Patent [19]
Sweger

[11] 3,717,803
[45] Feb. 20, 1973

[54] SERVO CONTROL
[75] Inventor: Russell P. Sweger, Rockford, Ill.
[73] Assignee: Barber-Colman Company, Rockford, Ill.
[22] Filed: March 29, 1971
[21] Appl. No.: 128,891

[52] U.S. Cl. .................. 318/471, 236/68 B, 219/511, 318/676
[51] Int. Cl. ............................................. G05b 11/01
[58] Field of Search ................. 318/471–473, 207 R, 318/221 H, 208, 676, 673, 675; 60/23; 236/68 C, 68 R, 68 G, ; 219/511

[56] References Cited
UNITED STATES PATENTS

| | | |
|---|---|---|
| 2,166,263 | 7/1939 | Parks et al. .......................... 236/68 B |
| 1,835,907 | 12/1931 | Shiland ............................. 318/675 X |
| 2,783,423 | 2/1957 | Streater et al. ....................... 318/676 |
| 2,175,032 | 10/1939 | Schaefer ........................... 318/221 H |
| 2,731,587 | 1/1956 | Brightman ........................ 318/472 X |
| 3,258,647 | 6/1966 | Clark ................................ 318/473 X |
| 3,488,568 | 1/1970 | Westley .............................. 318/208 |

*Primary Examiner*—Benjamin Bobeck
*Attorney*—A. Richard Kock

[57] ABSTRACT

A thermostatic bimetal strip heated by an input signal tends to close contacts causing a motor to move a driven device in a predetermined direction, while a cam moved in agreement with the driven device tends to open the contacts. The driven device may be biased to move in the opposite direction or may be driven in the opposite direction by a similar circuit responding to cooling of the bimetal strip.

9 Claims, 4 Drawing Figures

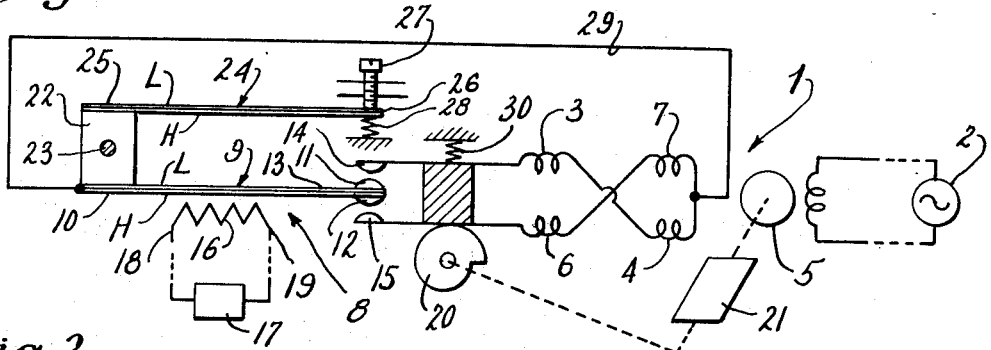
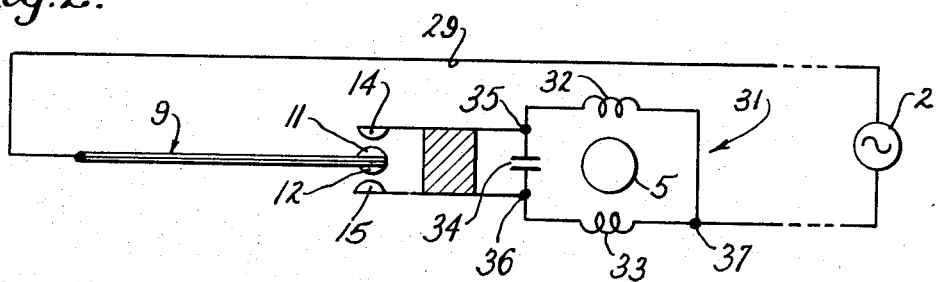
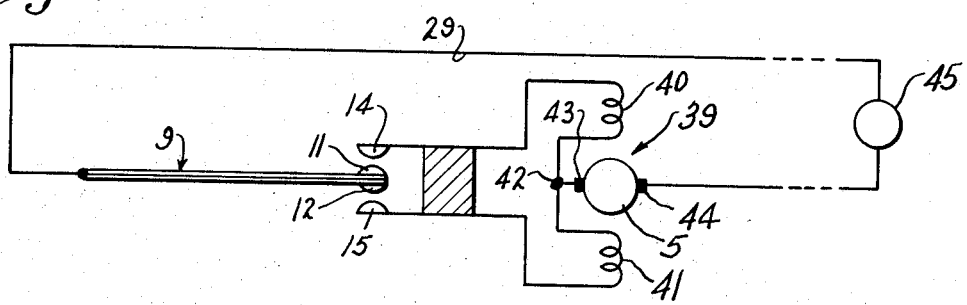
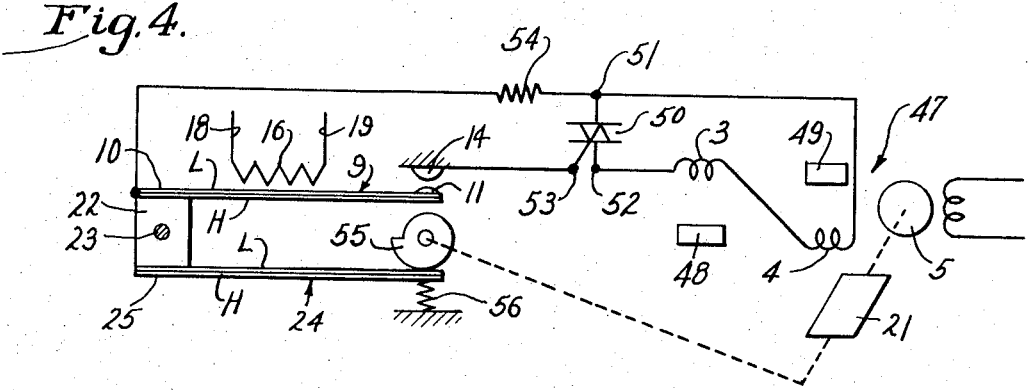

SERVO CONTROL

BACKGROUND OF THE INVENTION

This invention pertains to servo controls whereby a driven device is moved in either direction and stopped in response to input signals transmitted over only two interchangeable wires.

One of the primary problems with controls is the possibility that they may be incorrectly wired during installation. Such incorrect wiring may only render the control inoperative until the fault is found and corrected or it may result in improper operation of the control and the destruction of the control, the controlled device, or something acted upon by the controlled device. Often faulty wiring is difficult to locate even though it may involve only the transposition of connections. It is therefore desirable to design controls so that only one connection must be made during installation, or so that, if more than one connection must be made, the connections may be made in any combination without causing malfunction.

SUMMARY

This invention covers a servo motor control for positioning a driven device in proportion to an electrical input signal. The input may be alternating or direct current and may be amplitude or pulse modulated. The input is received over two interchangeable wires to eliminate the possibility of malfunction due to faulty connection of the input wires to the input terminals of the control. A feedback related to the position of the driven device is applied to the input receiver to assure that the driven device is positioned positively with respect to the input signal. The controls are very simple and inexpensive compared to other controls providing similar features.

BRIEF DESCRIPTION OF THE DRAWINGS

FIG. 1 is a schematic wiring diagram of a preferred embodiment of this invention.

FIG. 2 is a partial schematic wiring diagram of a modification of FIG. 1, showing only the forward and reverse circuits.

FIG. 3 is a partial schematic wiring diagram of another modification of FIG. 1, again showing only the forward and reverse circuits.

FIG. 4 is a schematic wiring diagram of another embodiment of this invention.

DESCRIPTION OF THE PREFERRED EMBODIMENTS

The embodiments of the invention described herein are merely examples of its applications and do not define the scope of the invention which is limited only by the claims.

As shown in FIG. 1 a reversible shaded pole motor 1 is energized from an external alternating current source 2 and has shading coils 3 and 4 to produce forward rotation of a rotor 5 when shorted and shading coils 6 and 7 to produce reverse rotation of the rotor 5 when shorted. An input signal receiver 8 comprises a heat responsive means such as a thermostatic bimetal strip 9 mounted at one and 10 and having a pair of contacts 11 and 12 affixed on opposite sides of the free end 13. Another pair of contacts 14 and 15 are mounted in insulated spaced opposed relation to each other in positions to be selectively engaged by the contacts 11 and 12 respectively. A heater 16 in heat transfer relation to the bimetal strip 9 receives a variable input signal from a remote signal transmitter 17 over wires 18 and 19. For best results the heater is usually wound around the bimetal. Contacts 14 and 15 are movable by feedback means, such as a cam 20, in agreement with the progressively changing position of a driven device, shown as an air flow controlling damper 21, movable by the motor 1 in accord with the input signal from transmitter 17. In order to provide for changing the relation between the input signal and the position of the damper 21, the mounted end 10 of bimetal 9 is fixed to a block 22 pivoted on a fixed pin 23 about which it is adjustably rotated by a similar compensating bimetallic strip 24 mounted at end 25 upon block 22. The other end 26 is restrained as between an adjustment screw 27 and a compression spring 28. The bimetal strips 9 and 24 extend in the same direction from block 22 and are mounted to deflect in the same direction (upwardly as shown by the high H and low L expansion sides) when heated.

A forward circuit is formed by contact 14, shading coils 3 and 4, a conductor 29, bimetal strip 9 and contact 11. A reverse circuit is formed by contact 15, shading coils 6 and 7, conductor 29, bimetal strip 9 and contact 12. Let us assume that the transmitter 17 is delivering an input signal over wires 18 and 19 to the heater 16. Since we are only interested in the heat generated in the heater 16 by the input signal, it does not matter whether the signal is alternating or direct current, whether the current is amplitude or pulse modulated, or in which direction it is flowing if it is direct current. For these reasons the order of connecting the transmitter 17 to the receiver 8 (heater 16) through wires 18 and 19 does not affect the operation of the receiver in any way and the wires can be freely transposed. When sufficient heat has been transferred from the heater 16 to deflect the bimetal 9 upward from its ambient temperature position far enough to engage contact 11 with contact 14, the forward circuit will be closed. If the motor 1 is at that time energized by alternating power source 2, a voltage will be induced in the shading coils 3 and 4, creating a current through the forward circuit and producing a flux shift causing rotation of the rotor 5 in forward direction. Forward rotation of the rotor 5 is converted into movement of the damper 21 in a predetermined direction, resulting in the cam 20 moving the contact 14 upwardly until it disengages contact 11, breaking the forward circuit and stopping the rotor 5, the driven damper 21 and cam 20. Now let us assume that the input signal to the heater 16 is reduces so that the bimetal strip 9 cools enough to move contact 12 downwardly into engagement with contact 15, closing the reverse circuit. If the motor 1 is energized, a voltage will be induced in shading coils 6 and 7, creating a current through the reverse circuit and producing a flux shift causing rotation of the rotor 5 in reverse direction. Reverse rotation of the rotor 5 is converted into movement of the damper 21 in opposite to the predetermined direction, resulting in cam 20 permitting a compression spring 30 or other means to move the contact 15 downwardly until it disengages contact 12 and so stops the rotor 5, the driven damper 21 and cam 20. It will be seen that by limiting the possible movement of the contacts 11 and 12 between contacts 14 and 15, as by adjustment of the spacing between contacts 14 and 15, very close control may be maintained over the position of damper 21 with respect to the changing input signal delivered to the heater 16. If the motor 1 is not energized when one of the forward or reverse circuits is closed, no rotation of the rotor 5 can be caused and the circuit closure merely enables the motor to drive the damper 21 and cam 20 when it is energized.

The position of the damper 21 corresponding to a given input signal may be adjusted by passing the given input signal through the heater 16 while the motor 1 is energized and then turning the adjusting screw 27 to change the angular position of the bimetal strip 9 around pin 23 until the damper 21 is at rest in the desired position. As shown clockwise rotation of the bimetal strip 9 around pin 23 has the same effect as reducing the input signal to the heater 16 and counterclockwise rotation has the same effect as increasing the input signal. If the ambient temperature changes, both bimetal strips 9 and 24 will deflect by the same amount due to the change in ambient temperature so hat the separation of the free end 13 from the restrained end 26 is dependent only upon the fixed spacing provided by the block 22 and the heat produced by the input signal flowing through the heater 16.

In FIG. 2 a reversible permanent split capacitor motor 31 has a pair of windings 32 and 33 and a capacitor 34 connected in a closed loop. A junction 35 between winding 32 and capacitor 34 is connected to contact 14 while junction 36 between winding 33 and capacitor 34 is connected to contact 15. The alternating current source 2 is connected between conductor 29 and junction 37 joining the windings 32 and 33. The forward circuit is formed by contact 14, the winding 32 and the series combination of capacitor 34 and winding 33 as parallel branches between junctions 35 and 37, alternating current source 2, conductor 29, bimetal strip 9 and contact 11. The reverse circuit is formed by contact 15, the winding 33 and the series combination of capacitor 34 and winding 32 as parallel branches between junctions 36 and 37, alternating current source 2, conductor 29, bimetal strip 9 and contact 12. Aside from the motor 31 and the electrical connections thereto described above, the control may be the same as in FIG. 1.

When contact 11 engages contact 14 to close the forward circuit, current flows through winding 32 to provide the in phase field, while the capacitor 34 creates a lagging current in winding 33 to provide the out of phase field and so cause rotation of the rotor 5 in the forward direction. When contact 12 engages contact 15 to close the reverse circuit, current flows through winding 33 to provide the in phase field while the capacitor 34 creates a lagging current in winding 32 to provide the out of phase field and so cause rotation in the reverse direction. In all other respects the control operates in the same manner as FIG. 1.

FIG. 3 shows a commutator type series or universal motor 39 having alternate series filed windings 40 and 41 respectively connected to the contacts 14 and 15 and joined together at junction 42 connected to brush 43. Brush 44 is connected to one side of a power source 45 providing either alternating or direct current, the other side of power source 45 being connected to conductor 29. Aside from the motor and its electrical connections as described above, the control is the same as in FIG. 1. Alternate separately excited shading coils of a reversible shade pole motor and alternate field windings of a direct current shunt motor may be connected in an analogous manner.

When contact 11 engages contact 14 to close the forward circuit through field winding 40, brush 43, armature or rotor 5, brush 44, power source 45, conductor 29 and bimetal strip 9, a field is created such that the armature 5 rotates in the forward direction. When contact 12 engages contact 15 to close the reverse circuit through field winding 41, brush 43, armature 5, brush 44, power source 45, conductor 29 and bimetal strip 9, a reversed field is created such that the armature 5 rotates in the reverse direction. In all other respects the control operates in the same manner as FIG. 1.

If one of the forward or reverse circuits is eliminated from any of the previously described figures, the driven device can be moved in only one direction.

In FIG. 4 reversing shaded pole motor 47 is identical to motor 1 in FIG. 1 except that the selectively shorted shading coils 6 and 7 have been replaced by permanently shorted shading coils or rings 48 and 49 continuously producing half rated torque in the reverse direction. With only this substitution, the rotor 5 is continuously biased to move the driven device 21 in opposite to the predetermined direction. When the forward circuit is closed, full torque is generated to overcome the bias and move the driven device 21 with half torque in the predetermined direction. According to this teaching the device 21 would be continuously moving in one direction or the other and could only approximate standstill condition as the contacts 11 and 14 repeatedly closed and opened. In order to reduce wear on contacts 11 and 14 under such conditions, a controlled switching means, such as a bidirectional solid state switch 50, is employed to close and open the forward circuit. The forward circuit comprises the shading coils 3 and 4, and bidirectional switch 50 from terminal one 51 to terminal two 52 in a series loop. The terminals 51 and 52 are also referred to as power terminals. The gate or control terminal 53 is connected to contact 14, and terminal 51 is connected through a current limiting resistor 54 and bimetal strip 9 to contact 11. When contacts 11 and 14 are closed, a control circuit is completed from shading coils 3 and 4, through resistor 54, bimetal strip 9, contacts 11 and 14, and the bidirectional switch 50 from gate terminal 53 to terminal two 52 to gate the switch 50 into the conductive state and so enable the forward circuit to permit the motor to drive the device 21 in the predetermined direction in opposition to the half torque produced by the shading coils 48 and 49. When contacts 11 and 14 are opened, the control circuit is broken and the bidirectional switch 50 ceases conduction and breaks the forward circuit the next time the instantaneous AC voltage across terminals 51 and 52 is reduced to zero. It will be obvious to those skilled in the art that a continuously energized half torque winding can be provided on other types of motors driving a device to bias the device to move in opposite direction, and that a separate motor, a return spring, or other means could be employed to provide the bias. It will also be obvious that similar contact protection can be provided for any of the other embodiments of this invention.

FIG. 4 discloses a different embodiment of the feedback in which the compensating bimetal strip 24 is movable by feedback cam 55 in agreement with the progressively changing position of the driven damper 21. This results in moving the contact 11 away from contact 14 with the same result as was accomplished in FIG. 1 by moving contact 14 away from contact 11.

I claim:

1. A servo control for positioning a device driven by a motor in response to an electric input signal comprising a forward circuit to control motion of the device in a predetermined direction, a heat responsive means mounted at one end, a heater in heat transfer relation to said responsive means and energizable by the input signal, said responsive means changing shape upon energization of the heater, first and second contacts, said first contact moved toward the second contact by said responsive means as a result of energization of the heater, closure of said first and second contacts enabling the forward circuit to permit the motor to drive said device in the predetermined direction, feedback means for moving one of said contacts away from the other in agreement with progressively changing positions of said device driven in the predetermined direction, biasing means to move said device in an opposite to the predetermined direction, and means for moving said second contact toward the first contact in agreement with progressively changing positions of said device in the opposite direction whereby said device remains relatively stationary in a position substantially corresponding to the position of the first contact as said second contact is moved repetitively into and out of engagement with the first contact.

2. A servo control according to claim 1 wherein said motor is a reversible shaded pole motor having first and second shading coils, the forward circuit comprising said first shading coils shorted by closure of the first and second contacts to produce full torque from the motor, and the biasing means comprising said second shading coils permanently shorted to produce substantially less than full torque from the motor in said opposite direction.

3. A servo control according to claim 1 further comprising a controlled switching means having a pair of power terminals and a control terminal, said control terminal in series with said first and second contacts in a control circuit for the switching means, and said power terminals connected in series in the forward circuit, whereby the forward circuit is enabled upon completion of the control circuit when said first and second contacts close.

4. A servo control for positioning a device driven by a motor in response to an electric input signal comprising a forward circuit to control motion of the device in a predetermined direction, a reverse circuit controlling motion of the device in an opposite to said predetermined direction, a heat responsive means mounted at one end, a heater in heat transfer relation to said responsive means and energizable by the input signal, said responsive means changing shape upon energization of the heater, first and second contacts, said first contact moved toward the second contact by said responsive means as a result of energization of the heater, closure of said first and second contacts enabling the forward circuit to permit the motor to drive said device in the predetermined direction, feedback means for moving one of said contacts away from the other in agreement with progressively changing positions of said device driven in the predetermined direction, a third contact in oppositely facing relation to the first contact and movable by said responsive means, a fourth contact in spaced opposed relation to said second contact for closure with the third contact, and means for moving one of said third and fourth contacts away from the other in agreement with progressively changing positions of said device in the opposite direction, closure of said third and fourth contacts enabling the reverse circuit to permit the motor to drive said device in the opposite direction, said device remaining stationary in a position substantially corresponding to the shape of the responsive means when none of said contacts are closed.

5. A servo control according to claim 4 wherein said motor is a reversible motor having selectively energized first and second windings, said forward circuit energizing the first winding, and said reverse circuit energizing the second winding.

6. A servo control according to claim 4 wherein said motor is a reversible alternating current motor having first and second windings for conducting currents, closure of said forward circuit establishing a predetermined phase relationship between the currents in said windings, and closure of said reverse circuit establishing an opposite to the predetermined phase relationship between the currents in said windings.

7. A servo control according to claim 4 wherein said motor is a reversible shade pole motor having first and second shading coils, the forward circuit comprising said first shading coils shorted upon closure of the first and second contacts, and the reverse circuit comprising said second shading coils shorted upon closure of the third and fourth contacts.

8. A servo control according to claim 1 additionally comprising means to compensate for the affect of ambient temperature on said heat responsive means.

9. A servo control according to claim 4 additionally comprising means to compensate for the affect of ambient temperature on said heat responsive means.

* * * * *